Sept. 5, 1944.  W. F. WOLFNER, 2D  2,357,371
ELECTRONIC APPARATUS
Filed Feb. 27, 1941

Inventor
William F. Wolfner, II
By Roberts, Cushman & Woodberry.
his Attys.

Patented Sept. 5, 1944

2,357,371

UNITED STATES PATENT OFFICE 2,357,371

ELECTRONIC APPARATUS

William F. Wolfner, II, Methuen, Mass., assignor to Photoswitch Incorporated, Cambridge, Mass., a corporation of Massachusetts Application February 27, 1941, Serial No. 380,885

11 Claims. (Cl. 250—27)

This invention relates to electronic apparatus of the type having a utility or load circuit controlled by changes of electrical properties in a controlling or detector circuit.

It is the main object of the invention to provide apparatus of this type which furnishes an output energy which is ample for ordinary switching or measuring purposes and yet can be axactly and adjustably controlled by minute changes in the detecting circuit which carries only a very weak current.

In one of its aspects, the invention provides for continuous detection of varying data to be supervised independently of detecting currents which are apt to be rather heavy and require delicate and yet comparatively large moving contact members with all the drawbacks of such influences as varying contact resistance, time lag and wear; in another aspect, the invention provides for instantaneous detection of the amount or existence of a preselected condition (for example in precision gaging) likewise largely independent of the mechanical condition of the detecting element; in yet another aspect, the circuit according to the invention provides for the detection of extremely small energy values with very simple and therefore reliable means; in still another aspect, the invention provides a circuit of this type which is especially versatile and adaptable through simple and easily comprehensible changes of a few circuit elements.

The present invention accomplishes these objects by a peculiarly appropriate arrangement of a minimum number of simple electrical construction elements, including an energy storing means in a detecting or supervising circuit which, for the detecting or supervising operation, applies a selected charge to an electronic control element affecting the controlled or load circuit. The detecting or supervising circuit does not depend on the passage of considerable currents of critical amounts, but rather operates through application of stored energy, so that this input circuit may contain contact or supervised elements of very high resistance, even of the nature of semi-conductors as hair feeler contacts, fluids of high resistance, and similar material of low conductivity.

These and other objects, aspects and features of the invention will be apparent and better understood from the following description, by way of example, of several typical embodiments thereof, the description referring to a drawing in which Fig. 1 is a diagrammatical representation of a circuit according to the invention for continuously supervising a changing value;

Figure 1:
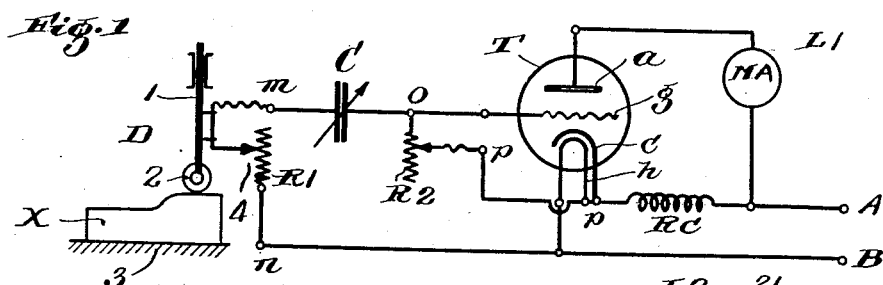

In the embodiment according to Fig. 1, A and B are terminals for connection to a source of current, for example standard alternating current, and T is an electron discharge tube with cathode $c$, anode $a$ and control grid $g$. Anode $a$ is connected to terminal A through a utility anode circuit containing a load device, as in this instance a milliammeter L1. Cathode $c$ has a heater element $h$ which is connected between terminals B and A in series with a suitable impedance, for example a reactor Rc furnishing a voltage drop which provides the cathode $c$ with the suitable potential, the cathode being in this instance connected between heater $h$ and reactor Rc so that its potential will correspond to the impedance values of $h$ and Rc.

Between grid and cathode is connected a detector circuit comprising condenser and resistance elements. A condenser C and a resistance R1 with terminals $m$, $n$ are connected in series between source terminal B and grid $g$. A second resistance R2, with terminals $o$ and $p$, may be connected between grid $g$ and cathode $c$. It is essential that points $n$ and $p$, that is one end of the circuit grid—condenser C—resistance R1, and cathode $c$, respectively, are of different potential. In the present instance this is accomplished by connecting the heater element $h$ therebetween, but it is understood that this potential difference can be provided by different means, for example a separate impedance, for example if the heater is supplied from a separate source.

Condenser C as well as resistances R1 and R2 may be variable, and adjustable, as indicated in Fig. 1.

For certain purposes, the resistance R2, connected directly between grid and cathode, may be permanently infinite, that is, omitted; and either resistance R1 or R2, or both, may be used as circuit elements whose values are changed for controlling the utility circuit and, for that purpose, this controlling resistance element may normally have an infinite value. Examples of these various possibilities will now be explained in detail.

In the embodiment according to Fig. 1, resistance R1 is variable and controlled by a gage apparatus D comprising a plunger 1, a feeler element 2, a base 3 and a movable contact 4 following the movement of plunger 1 and varying the value of resistance R1 proportionate to the height of article X placed on base 3 to be measured.

This arrangement operates as follows:

Assuming that terminals A, B are supplied with alternating current, that terminal B is negative at a certain instance, and that resistance R1 is comparatively high and properly correlated to the characteristics of condenser C and tube T, the tube will conduct and a certain load current will be indicated by milliammeter L1.

Upon terminal B becoming positive, the tube will become non-conductive, but due to the potential difference between points n and p a certain current (depending upon the values of that potential difference and of resistance R1) will then flow in the circuit B—n—R1—m—C—o—g—p—Rc—A. This current charges condenser C approximately to the peak value of the voltage between points n and p. This is a direct current voltage due to the rectifying effect of the tube which, during this half cycle, does not permit direct current flow from B to A, whereas the above traced grid current is passed.

During the next half cycle and all following half cycles when B is negative (assuming that the detector circuit values of R1, C and R2 remain constant), the tube conductivity is reduced due to the negative bias furnished by the charge left on condenser C following its charge during the half cycles when B is positive.

Some of the charge will, during the charging and the following cycle, leak through R1 and R2, so that, by changing R1 or R2, the effective grid potential, and hence the tube conductivity, can be controlled. For example, if resistance R1 is lowered because plunger 1 follows a depression in article X, the leakage current will be greater, the charge remaining on C smaller, the grid bias less effective and the tube conductivity increased. By appropriately calibrating the scale of milliammeter L1, the thickness variations of article X can be directly read on that instrument.

The operation of this circuit can be easily adjusted to varying measuring ranges by setting a basic leakage through adjustment of R2, or by setting a basic grid bias value through varying the capacitance of condenser C.

Figure 2:
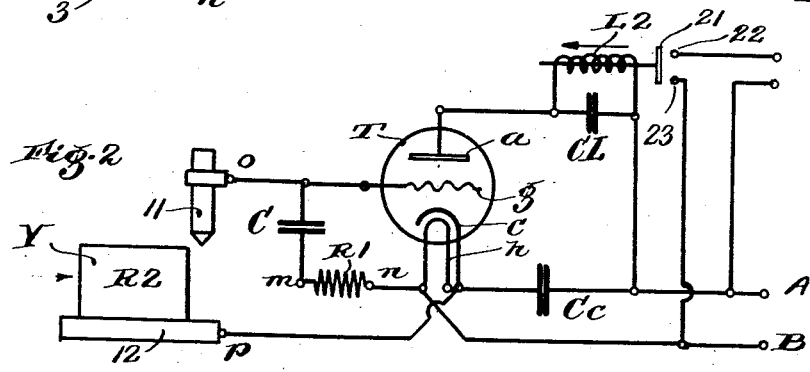
Fig. 2 is a similar diagram of a circuit for detecting the existence or non-existence of a given condition.

As mentioned above, one resistance can be made normally infinite, that is, the detector circuit may be normally open. Such an embodiment is shown in Fig. 2, where terminals o, p of resistance R2 are connected to a feeler contact 11 and a conductive base plate 12, respectively. The circuit is otherwise essentially the same as that of Fig. 1; however, instead of instrument L1, a magnet L2 is connected in the anode circuit, which magnet operates a switch element 21, for example closing contacts 22, 23 upon energization. A condenser CL is connected across coil L2.

The operation of an embodiment according to Fig. 2 is as follows:

So long as detecting contacts 11, 12 are open, that is so long as resistance R2 is infinite, condenser C will be charged by a current B—n—R1—m—C—o—g—c—Cc—A during the half cycles when B is positive, and the discharge during the alternate half cycles will render the grid sufficiently negative to block any current through tube T, so that magnet L2 will be deenergized and contacts 22, 23 open. It will be understood that the values of the circuit elements can be so chosen that the grid will be biased below the blocking value. For example, with a tube of type 35A5, a condenser C of about .01 mfd., a resistor R1 of about 1 megohm, a magnet L2 matching the tube and a condenser Cc of about 4 mfd. will accomplish this result, that is, supply just enough grid bias to retain the magnet deenergized so long as terminals o, p remain disconnected.

If now an object Y is introduced between contacts 11 and 12, big enough to touch gaging contact 11, resistance R2 will be lowered and the leakage current in circuit 11—o—C—m—R1—n—h—p—12 increased, so that the charge on condenser C will now be insufficient to apply to the grid a potential sufficiently negative to block the tube current. The tube becomes conductive and magnet L2 energized during the half cycles when B is negative; condenser CL is charged during these half cycles and maintains magnet L2 energized during the half cycles when B is positive.

The detecting circuit can be adjusted by varying the values of C and R1 in such a manner that a very slight leakage current through Y will be sufficient to render the tube conductive and to close contacts 22, 23 which may operate a signal indicating that article Y is larger than the dimension defined by the distance between point U and plate 12. A very sensitive gage selecting oversize articles is provided in this manner.

It will now be evident, that a circuit according to Fig. 1 can be similarly operated. If contact elements 11 and 12 are connected to terminals m and n, respectively, of Fig. 1, the tube will be conductive so long as 11 and 12 are open preventing the condenser C from being charged and hence from applying a negative potential to the grid. As soon as connection is established between 11 and 12, condenser C will be charged, will bias grid g, and render tube T non-conductive. It should be especially noted in this connection that the amount of current flowing through Y can be very small, as long as m is connected to n and hence B for the purpose of putting a negative potential on the o terminal plate of the condenser during the half cycles when B and m are positive.

Figure 3:
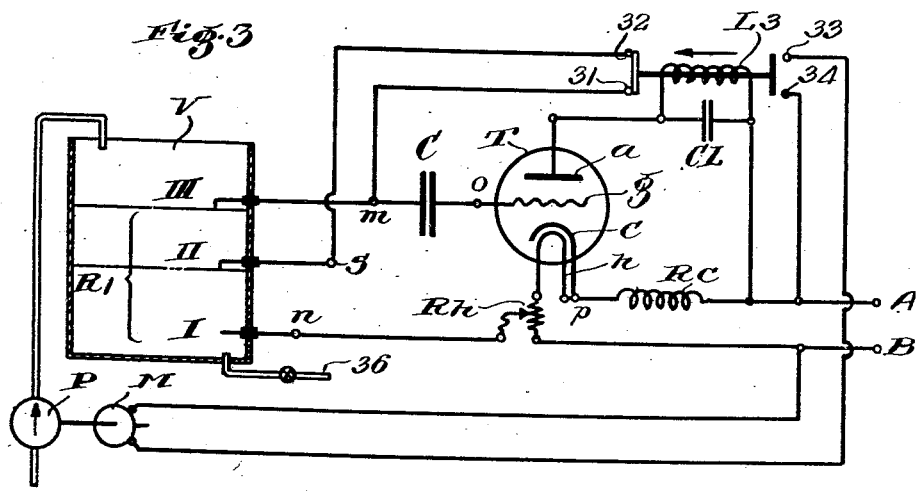
Fig. 3 is a diagram showing an application of the invention to a liquid level control installation.

Sometimes it is advantageous to omit the leakage resistance R2 of Fig. 1 or R1 of Fig. 2; Fig. 3 shows an embodiment of such a circuit as applied to a liquid level control installation.

In Fig. 3, the tube and load circuits are essentially the same as in Fig. 1, with the difference that magnet L3 operates two switches with contacts 31, 32 closed when the magnet is energized, and contacts 33, 34 closed when the magnet is deenergized. A tank V is provided with three probes I, II, III, connected to circuit terminals n, s, m, respectively. Terminal n is connected to the heater element h and source terminal B, as in Fig. 1; terminal m is connected to one plate of condenser C whose second plate is at o connected to grid g of tube T; m is also connected to contact 31 and terminal s to the other contact 32 of switch L3. If desired, a resistance R2 may be introduced for regulating the potential difference between points p and n.

Contacts 33 and 34 of switch L3 control the supply circuit of a motor M driving a pump P which feeds fluid to tank V.

This arrangement functions as follows:

With the tank empty, contacts m and n are disconnected, condenser C does not receive a charge, grid g does not carry a negative bias potential, tube T is conductive and magnet L3, sustained by condenser CL maintains contacts 33, 34 closed. Motor M is therefore supplied with current from line A, B and drives pump P which feeds liquid into vat V.

As soon as the liquid level reaches probe III, a conductive connection is established between m and n, condenser C is charged through circuit B—n—I—V—III—m—C—o—g—c—Rc—A and renders the tube non-conductive, opening contacts 33, 34 and closing contacts 31, 32. The connection at 31, 32 so to speak transfers terminal M to terminal m. Therefore, so long as the liquid level is above probe II, terminals m and n are connected, magnet L3 deenergized and pump P inactive. This condition is indicated in Fig. 3.

When for example, through drainage at 36, the liquid level falls below probe II, the condenser is again disconnected, magnet L3 opens contacts 31, 32 and closes contacts 33, 34, and liquid is fed into the tank until probe III is again reached and the pump stopped, through application of a biasing charge on condenser C to grid g of tube T. It will be evident that a simple arrangement of this type will maintain the liquid level between probes II and III, even if the liquid conducts only to a very slight degree.

By omitting the leak resistance corresponding to R2 of Fig. 1, the following effect can be obtained. If, in that case, resistance R1 is comparatively low, condenser C will be charged immediately to that value which puts a blocking biasing potential on the grid; instantaneous trigger action is therefore obtained. On the other hand, if R1 is rather high, there will be a time delay before condenser C is sufficiently charged to decrease or to stop the conductivity of the tube.

This time delay may be desirable in certain instances. For example, if in arrangements according to Fig. 3 the liquid level has a tendency to be irregular as due to splashing, the m and n terminals might only be instantaneously connected, with an obviously disturbing effect. If, however, the time delay is taken advantage of, momentary connection of m and n will be ineffective and the switching apparatus L3 actuated only when the actual liquid level has reached the respective probe.

Figure 4:
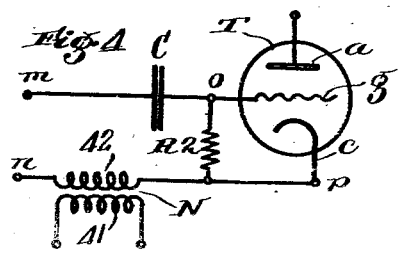
Fig. 4 is a diagram illustrating a modification with independent supply of the energy storing device.

In the above embodiments, the potential for charging the energy storing means, as for example condenser C, for controlling the grid is derived from the tube supply source A, B. Instead, an independent source cyclically supplying a charging potential may be used. Fig. 4 shows such an arrangement. All elements of this figure correspond to those of Fig. 1, but an independent potential supply is added, by way of example shown as secondary 42 of a transformer N, whose primary 41 is connected to a suitable supply 43, 44 of potential impulses, for example alternating current. It will now be evident that, with terminals m, n for example open, condenser C cannot be charged; as soon as m and n are connected, the condenser will be charged in a circuit n—m—C—o—g—c—p during a period when potential is supplied by N, and thereafter will impress its charge on grid g, whereby the conductivity of tube T can be controlled as above described.

It should be understood that the present disclosure is for the purpose of illustration only and that this invention includes all modifications and equivalents which fall within the scope of the appended claims.

I claim:

1. Electronic apparatus comprising a current source; a high vacuum electron discharge tube with cathode, grid, and anode; an anode circuit including a connection from said cathode to one terminal of said source, a connection from said anode to the other terminal of said source, and means responsive to the state of conductivity of said tube; and a detector circuit connected between said grid and said cathode and including means for storing energy, means for charging said storing means, means for adjusting the value of the charge, and means for applying to said grid a variable amount of said charge, for biasing said grid to change said conductivity and to control said responsive means proportionate to said variable amount of charge.

2. Electronic apparatus comprising a current source; a high vacuum electron discharge tube with cathode, grid, and anode; an anode circuit including a connection from said cathode to one terminal of said source, a connection from said anode to the other terminal of said source and means responsive to the state of conductivity of said tube; a detector circuit connected between said grid and said cathode and including two resistances, means for storing energy and means for supplying potential impulses to charge said storing means through and under control of one of said resistances; and means for discharging said storing means by varying the other resistance; said storing means biasing said grid upon being charged by a potential impulse to change said conductivity and to control said responsive means, proportionate to the charge on the storing means as controlled by said resistances.

3. Electronic apparatus comprising an alternating current source; a high vacuum electron discharge tube with cathode, grid, and anode; an anode circuit including an impedance connection from said cathode to one terminal of said source, a connection from said anode to the other terminal of said source and means responsive to the state of conductivity of said tube; a detector circuit connected between said grid and said cathode and including a variable resistance and means for storing energy in parallel connection to said resistance for sending during half cycle periods a current through said detector circuit; and means for the adjustable dissipation of said stored energy, said energy storing means, upon being charged due to said current biasing said grid to change said conductivity and to control said responsive means proportionate to said charging current and said dissipation.

4. Electronic apparatus comprising a current source; an electron discharge tube with cathode, grid, and anode; an anode circuit including a connection from said cathode to one terminal of said source, a connection from said anode to the other terminal of said source and means responsive to the state of conductivity of said tube; a detector circuit including in series a detector gap, a condenser, said grid and means for supplying potential impulses to said condenser; and an adjustable leakage path for said condenser, said condenser, upon being charged through the closed gap by a potential impulse biasing said grid to change said conductivity and to control said responsive means, proportionate to the charge on the condenser and the leakage therefrom.

5. Electronic apparatus comprising an alternating current source; a high vacuum electron discharge tube with cathode, grid, and anode; an anode circuit including a connection from said cathode to one terminal of said source, a heater for said cathode constituting a potential apportioning impedance in said connection, a connection from said anode to the other terminal of said source and means responsive to the state of conductivity of said tube; and a detector circuit including a variable resistance and a condenser in series connection between said grid and said first terminal, and a resistance between said grid and said cathode; said condenser, upon being charged due to current flowing through said first resistance, biasing said grid to change said conductivity and to control said responsive means.

6. Electronic apparatus comprising an alternating current source; an electron discharge tube with cathode, grid, and anode; an anode circuit including a connection from said cathode to one terminal of said source, a connection from said anode to the other terminal of said source and means responsive to the state of conductivity of said tube; a detector circuit including a detector gap and a condenser in series connection between said grid and said first terminal; and a resistance between said grid and said cathode; said condenser, upon being charged through said gap, biasing said grid to control said responsive means.

7. Electronic apparatus comprising an alternating current source; a high vacuum electron discharge tube with cathode, grid, and anode; an anode circuit including a connection from said cathode to one terminal of said source, a connection from said anode to the other terminal of said source and means responsive to the state of conductivity of said tube; and a detector circircuit including means for storing energy between said grid and said first terminal, and a detector resistance connected between said grid and a point arranged to carry a potential intermediate the potentials of said terminals; said energy storing means upon being charged biasing said grid to degrees controlled by leakage current through said detector resistance.

8. Electronic apparatus comprising an alternating current source; an electron discharge tube with cathode, grid, and anode; an anode circuit including a connection from said cathode to one terminal of said source, a potential apportioning impedance in said connection, a connection from said anode to the other terminal of said source and means responsive to the state of conductivity of said tube; and a detector circuit including a resistance and a condenser in series connection between said grid and said first terminal, and a detector gap connected between said grid and said cathode; said condenser being adapted for comparatively quick charge by the grid current of said tube and, upon being charged, biasing said grid to degrees controlled by the current through said gap.

9. Electronic apparatus comprising an alternating current source; an electron discharge tube with cathode, grid, and anode; an anode circuit including a connection from said cathode to one terminal of said source, a connection from said anode to the other terminal of said source, and a relay controlling two switches, one of which is open and the other closed upon energization of the relay; a detector circuit including a condenser in series connection between said grid and a probe and a second probe connected to said first terminal; a third probe connected to one of said two probes through said first switch; and means controlled by said second switch for conductively connecting said probe.

10. Electronic apparatus comprising a current source; an electron discharge tube with cathode, grid, and anode; an anode circuit including a connection from said cathode to one terminal of said source, a connection from said anode to the other terminal of said source and means responsive to the state of conductivity of said tube; a detector circuit including a detecting gap, a condenser, and a source of current impulses connected in series between said grid and said cathode; and a leakage impedance for said condenser between said grid and said cathode; said condenser being adapted for comparatively quick charge and upon being charged by said current source biasing said grid to change said conductivity and to control said responsive means, proportionate to the charge on the condenser and the leakage therefrom.

11. Electronic apparatus for maintaining the level of material between two probes of a container, comprising an alternating current source; an electron discharge tube with cathode, grid and anode; an anode circuit including a connection from said cathode to one terminal of said source, a connection from said anode to the other terminal of said source, and relay means adapted to actuate a probe switch which is opened upon energization of said relay means and a relay switch; a detector circuit including a condenser in series connection between said grid and one of said probes; a connection between said material and said first terminal; a connection between said probes through said probe switch; and means controlled by said relay switch for supplying material to said container upon energization of said relay means due to disconnection of said probes by the material falling therebelow.

WILLIAM F. WOLFNER, II.